Figure 1:
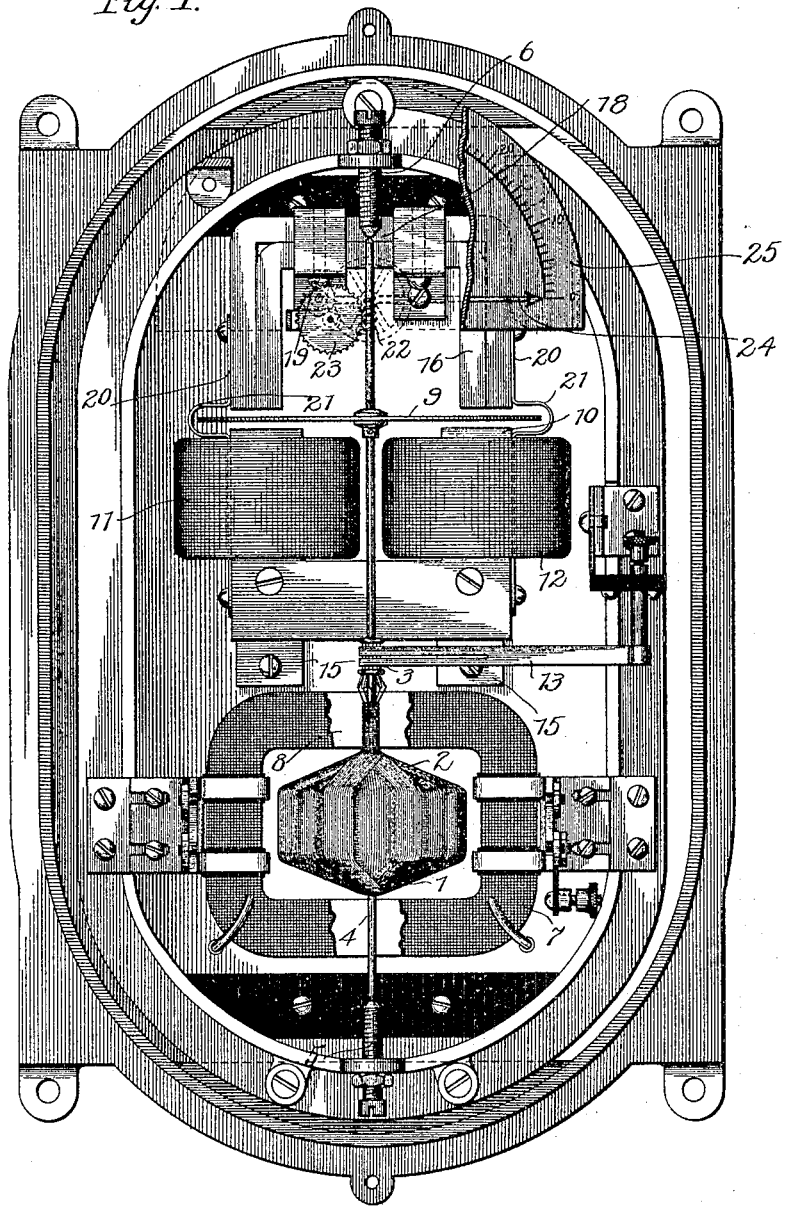

No. 808,115. PATENTED DEC. 26, 1905.
H. W. SAYLES.
ELECTRICAL METER.
APPLICATION FILED MAR. 13, 1905.

2 SHEETS—SHEET 1.

Witnesses:
Leonard W. Novander.
Charles J. Schmidt.

Inventor
Henry W. Sayles
By Charles A. Brown
Attorney

No. 808,115. PATENTED DEC. 26, 1905.
H. W. SAYLES.
ELECTRICAL METER.
APPLICATION FILED MAR. 13, 1905.

2 SHEETS—SHEET 2.

Witnesses:
Leonard W. Novander.
Charles J. Schmidt.

Inventor
Henry W. Sayles
By Charles A. Brown
Attorney

UNITED STATES PATENT OFFICE.

HENRY W. SAYLES, OF PEORIA, ILLINOIS, ASSIGNOR TO DIAMOND METER COMPANY, OF PEORIA, ILLINOIS, A CORPORATION OF ILLINOIS.

ELECTRICAL METER.

No. 808,115.  Specification of Letters Patent.  Patented Dec. 26, 1905.

Application filed March 13, 1905. Serial No. 249,721.

*To all whom it may concern:*

Be it known that I, HENRY W. SAYLES, a citizen of the United States, residing at Peoria, in the county of Peoria and State of Illinois, have invented a certain new and useful Improvement in Electrical Meters, of which the following is a full, clear, concise, and exact description, reference being had to the accompanying drawings, forming a part of this specification.

My invention relates to a measuring instrument, and particularly to electrical measuring instruments for measuring the ampere-hours in a direct-current circuit regardless of the voltage or voltage variation. An instrument of this kind is very useful in connection with storage-battery systems for merely measuring the charging and discharging current thereof regardless of the voltages at which this current may be delivered.

The meter consists of an armature provided with windings and disposed within the field of series coils, a spindle supporting the armature being suitably pivoted and also supporting a commutator and damping-disk and also connected with gearing-trains connected with a pointer adapted to travel over a scale. Damping means in the shape of an electromagnet are employed, and the energizing-coils of this electromagnet are of high resistance and included in the pressure-circuit in series with the commutator and armature-windings. When the meter is connected in circuit, for instance, with storage batteries and the charging-current is connected, the meter will rotate and the pointer will indicate at any time the number of ampere-hours charged into the battery. Upon discharge in the same manner the pointer will travel toward its inward position and at any time will indicate the number of ampere-hours drawn from the battery and the number still remaining therein. Should the voltage increase, for instance, over that for which the meter is adjusted, there would be greater current-flow through the electromagnet-windings and also through the armature-windings connected serially in circuit therewith. The increased current-flow through the armature-windings will tend to produce faster rotation thereof; but the same increase of current through the electromagnet-coils connected in series with the armature will tend to increase the number of lines of force through which the damping-disk must travel, and the opposite effect of retardation will be produced on the spindle. The rate of increase in the damping by the electromagnet will not be proportional to the increased speed tended to be occasioned by the armature, and consequently the reading of the meter will not be proportional to the current. This is also true should the pressure be reduced below that for which the meter is adjusted, and the effect of the electromagnet will be to overpower the effect which would tend to produce decreased speed of the armature, and the reading will therefore be fast. To compensate for this difference in effects of the electromagnets and the armature, I associate a permanent magnet with the electromagnet, the permanent magnet being disposed to be magnetically in series with the electromagnet. Upon increase of pressure over the normal the tendency of the electromagnet to overcome the effect on the armature to decrease the speed thereof will be corrected by the permanent magnet upon decrease in pressure, and upon suitable adjustment between the permanent and electro magnets the meter can be made to read accurately.

I will now describe my invention more clearly, with reference to the accompanying drawings, in which—

Figure 2:
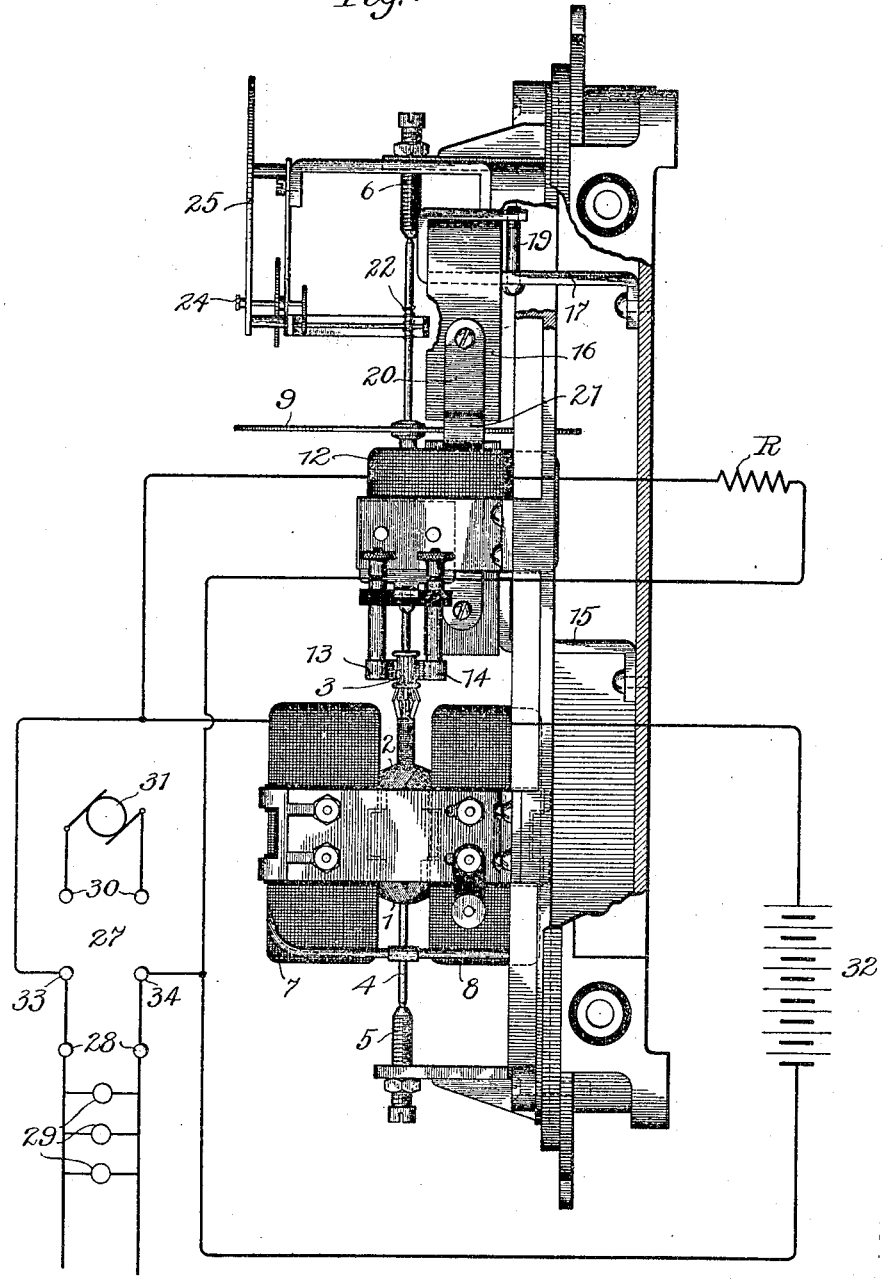

Figure 1 is a front elevation view of the meter, the cover thereof being removed; and Fig. 2 is a side elevation of the meter, the cover being removed and a part of the inclosing-casing wall broken away.

The armature 1 of the meter is provided with the windings 2, suitably connected with the commutator 3, the armature and commutator being mounted on a spindle 4, pivoted in pivot-screws 5 and 6. The armature is arranged within the field of the series coils 7 and 8. A damping-disk 9 is secured to the spindle and rotates over the pole ends of an electromagnet-core 10, provided with the energizing-coils 11 and 12. The brushes 13 and 14 engage the commutator. The electromagnet-core frame may be suitably secured to the meter-frame by means of supports 15 15, and secured above the disk is a permanent horseshoe-magnet 16, which may be composed of laminations and whose poles are arranged opposite the poles of the electromagnet in such a manner that the two electromagnets are magnetically serially in circuit. The permanent magnet is secured to the upper part of the supports 17, which are secured to the meter-frame and at their upper ends are hooked about the yoke 18 of the permanent magnet, and clamping-screws 19 engage through the body part of the support 17 and with the ends of the hooks projecting below the yoke. The magnets are further secured in position by means of side plates 20, which are fastened to the side of the magnets, and are provided with loops 21 about the edge of the damping-disk. The magnets also are slightly displaced from the diametrical line through the disk.

The spindle above the disk has worm-threads 22 meshing with gearing 23, suitably connected with a pointer 24, traveling over the scale-disk 25, which may be secured to the meter-frame in any suitable manner.

In Fig. 2 I have shown the circuit arrangements employed where the meter is utilized for indicating current-flow from storage batteries. A two-way switch 27 is shown, whose alternate contacts 28 are connected with a circuit for supplying translating devices 29, while the other alternate contacts 30 are connected with a charging source 31. The storage battery 32 is connected with the middle contacts 33 and 34 serially through the series coils 7 and 8. A shunt or pressure circuit is connected with the middle contact-leads and serially includes the energizing-coils of the electromagnet, the brush 14, the armature-winding, and the brush 13, and the resistance R may also be included in this circuit for adjusting purposes.

When the storage battery is to be charged, the switch is thrown to connect the charging source 31 in circuit therewith, and when discharging the translating-device circuit is connected therewith. In both instances the currents will flow through the meter, but in opposite directions.

Assuming that the pointer of the meter is normally at zero and the battery connected with the charging source, then as the charging goes on the pointer will travel over the scale and will indicate the ampere-hours flowing into the battery, and when the battery has been filled to its full capacity the switch is thrown to allow the battery to discharge through the translating devices, and by observing the pointer the amount of ampere-hours absorbed by the translating devices and the amount still remaining in the battery can be determined, and when the pointer has returned to zero the batteries of course must be recharged.

The pressure-current upon variation will tend to cause either increase or decrease in the speed of the armature; but at the same time the effect of the same current flowing through the energizing-windings of the electro damping-magnet will be to produce the opposite effect on the speed of rotation. For instance, if the pressure increases the current in the pressure-circuit also increases, and the tendency through the armature will be to increase the speed of rotation. More lines of force, however, will be caused to flow through the disk, and the tendency will be to offset the increased speed occasioned by the armature and to maintain normal speed. It is found, however, that the effects of the electromagnet and the armature are not proportional and that the effect of the electro damping-magnet will more or less overpower the armature effect. To compensate for and to correct this difference in effects of the armature and electromagnet, I provide the permanent magnet, as above described, the effect of which magnet is to resist the overpowering effect of the electromagnet, and by suitable adjustment between the magnets the meter can be regulated to respond solely to the current changes unaffected by the variations in the pressure.

I do not wish to be limited to the arrangement of the meter parts as herein shown, as their disposition, construction, and arrangement may readily be varied without departing from the principle and scope of the invention.

I claim as new and desire to secure by Letters Patent—

1. In a meter, the combination with an armature secured to a spindle, of a series field for said armature, a damping-disk secured to the spindle, an electromagnetic damping-magnet for said disk, the windings on said electromagnet being included serially in circuit with the armature-windings, and a permanent magnet associated with the electromagnet, the combined effect of said damping and electro magnets being to cause the speed of rotation of the spindle to be proportional to current changes independent of pressure changes.

2. In a meter, the combination with an armature, of a series field therefor, a damping element for traveling with said armature, an electromagnetic damping-magnet associated with the damping element, windings for said electromagnet, said windings and the armature-winding being included serially in the meter pressure-circuit, and a permanent damping-magnet also associated with the damping-disk and in magnetic circuit with the electromagnet, the combined effects of said damping-magnets being to cause a speed of rotation of the armature proportional to the current-flow of the meter independent of the pressure.

3. In a meter, the combination with an armature provided with windings and secured to a spindle, recording mechanism actuated upon rotation of the armature, series field-coils associated with the armature, a damping-disk secured to the spindle, an electromagnet disposed near the disk to cause damping thereof, coils for said electromagnet, said coils and the armature-winding being connected serially in the pressure-circuit of the meter, the damping effect of said electromagnet upon changes in pressure varying with the increased speed tendency of the armature to oppose the change in speed thereof occasioned by change in pressure, and a permanent magnet acting in conjunction with said electromagnet for causing the damping effect on the disk to be exactly proportional to the change in torque of the armature occasioned by current changes in the pressure-circuit, whereby the meter will indicate current-flow through the main circuit independent of pressure changes in the circuit.

4. In a meter, the combination with an armature provided with a winding and secured to a pivoted spindle, of indicating mechanism actuated upon rotation of the armature, series field-coils for the armature, a damping-disk secured to the spindle, an electromagnet for damping the rotation of the spindle, energizing-coils for said electromagnet, said coils and the armature-winding being connected serially in the meter pressure-circuit, and the permanent magnet opposite the electromagnet and in magnetic series therewith, the combined effect of the electromagnet and permanent magnet being to vary the damping of the disk in proportion as the speed of the armature tends to vary upon changes of pressure in the pressure-circuit, whereby the meter will indicate current-flow independent of pressure variations.

5. In a meter, the combination with an armature provided with windings and secured to a pivoted spindle, recording mechanism actuated upon rotation of the armature and spindle, series field-coils embracing the armature, a damping member secured to the spindle, an electromagnet having its poles near the damping element to direct lines of force therethrough, energizing-coils for said electromagnet, said coils and the armature-winding being included serially in the meter pressure-circuit, and a permanent magnet at the opposite side of the damping element, the two magnets being connected in magnetic series and so related that their combined retarding effect on the damping element is proportional to the varying rotative tendency on the armature occasioned by variation of current-flow through the meter pressure-circuit, whereby the meter will register current-flow through the main circuit independent of pressure variation.

In witness whereof I hereunto subscribe my name this 10th day of March, A. D. 1905.

HENRY W. SAYLES.

Witnesses:
J. F. MILLEMANN,
W. J. H. CRIBB.